UNITED STATES PATENT OFFICE.

JOSEPH ESREY JOHNSON, JR., OF HARTSDALE, NEW YORK; MARGARET HILLES JOHNSON EXECUTRIX OF SAID JOSEPH ESREY JOHNSON, JR., DECEASED.

PROCESS FOR PRODUCING IRON ALLOYS.

1,318,764.     Specification of Letters Patent.     Patented Oct. 14, 1919.

No Drawing.     Application filed February 9, 1918. Serial No. 216,316.

*To all whom it may concern:*

Be it known that I, JOSEPH ESREY JOHNSON, Jr., a citizen of the United States, residing at Hartsdale, in the county of Westchester and State of New York, have invented new and useful Improvements in Processes for Producing Iron Alloys, of which the following is a specification.

My invention relates to low carbon ferro-alloys and consists in a new process for the production of such alloys which is particularly adapted for use with lean ores as well as with the richer ores. The essential steps of my process are the reduction by carbon in the presence of iron of the ore of the alloying metal accompanied by the reduction of enough silicon to keep down the carbon in the alloy, and then oxidizing out the silicon.

There are many ferro-alloys used in the steel industry for imparting certain elements to the steel, such as ferro-manganese, ferro-chromium, ferro-titanium, ferro-vanadium and others. Nearly all of these alloying elements or metals can be produced from their ores most easily and inexpensively by using carbon as the reducing agent, but, when so reduced, are subject to the serious disadvantage that their carbon content is generally high. This is objectionable for either one or both of two reasons;—one, it is undesirable to impart carbon to the steel with the alloy and sometimes the quality of steel desired cannot be made if the carbon content is thus raised; two, the presence of carbon is sometimes undesirable because it makes the solution of the alloy in the bath more difficult.

For these reasons carbon-free alloys of some of these elements are made by using metallic aluminum as a reducing agent instead of carbon, but this is open to the serious objection that the alloys so produced generally cost several times as much as the alloys reduced with carbon. Moreover, in the manufacture of such alloys, by the ordinary methods, very pure ores are important because the silica present must be slagged off, frequently taking with it as a silicate a substantial quantity of the alloying elements or metal in question and thus wasting material and fuel, and reducing the output of the furnace.

By my process I can produce, practically and commercially, carbon free, or at least low carbon, alloys by the use of carbon as a reducing agent without the expense of using aluminum, and I can make use of the leaner ores, even ores of such a low grade as have never been used to advantage. To practice my process I charge into the furnace the ore of the given element and a source of iron in the desired quantity, either in the form of iron ore or scrap steel. If silica is not present in the charge, I add it in the form of sand or silica rock, or in some other convenient form and reduce the charge in a high temperature reducing furnace. An ordinary blast furnace or an electric furnace may be used, but I prefer a small blast furnace of ordinary construction blown with an enriched oxygen blast because it is much cheaper and more convenient to operate than the electric furnace and gives much higher temperatures than the ordinary blast. With the high temperature furnace I thus produce an alloy consisting of (a) the desired element, (b) iron, (c) silicon in sufficient amount to hold down the carbon to the desired limit. The amount of carbon charged into the furnace initially depends upon the nature of the charge used, as some carbon is desirable for reduction, but it is not desired to use so much as to necessitate an increased amount of the oxidizing agent, as silica, in the example given. Also, the amount of carbon in the original charge will vary according to whether or not the crude alloy is to be wholly free of carbon, or merely to have a small percentage thereof. The amount of silicon varies in the different cases and with the carbon limit desired. For silicon has the important quality of excluding carbon from ferro-alloys to a progressive extent as its quantity is increased. If an excess of silica is present I can of course slag it off by any desirable method.

It will be understood that in some cases a limited amount of carbon will not be detrimental but a higher amount would be, and in such cases I do not aim to keep out all the carbon but only to keep it below the detrimental limit. For instance a 30% chrome alloy with 2% carbon would be desirable, but a substantial increase in the carbon would render it useless for many purposes.

Having thus obtained the low carbon alloy I proceed to eliminate the silicon which I prefer to do as follows: Previous to the time of tapping the furnace, I prepare an oxidizing agent. For this purpose I prefer iron oxid and lime with a small amount of flux, such as silica or fluorspar, to make it readily fusible. I pour this mixture, highly heated and preferably fused, into a ladle, and then tap or pour thereinto the alloy from the high temperature furnace, the amount of liquid oxid being proportioned to the amount of silicon to be removed from the alloy. A reaction immediately takes place which is promoted by stirring by hand, or otherwise if necessary. The silicon is oxidized by the oxygen from the iron of the liquid oxid bath, and is converted into silica which is fluxed by the lime accompanying the iron oxid, while the iron is reduced and enters the alloy. If it be not desirable to introduce sufficient silicon to keep out all the carbon then of that carbon present, some will be oxidized, thus still further reducing the carbon content of the alloy. A separation of the slag and alloy takes place by gravity and they are poured off separately.

I thus produce a practically carbon free alloy by an economical method, and render it substantially free from silicon due to the quantitative oxidizing effect to which the alloy is subjected after it leaves the reducing furnace.

For example, an ore having 40% manganese, 9% iron, and 18% silicon, is at present commercially undesirable because of high silicon and low manganese contents. If efficiently reduced by known methods of smelting, a crude alloy would result of approximately 67% manganese, 18% iron, 13.8% silicon, and 1.2% carbon. This crude alloy in the example here given, differs materially in composition from ferro-silicon, as will be self-evident. If the same ore be melted, an oxidizing bath would result of approximately: Manganese oxid 60.5%, iron oxid 13.3%, silica 20.7%, and lime, alumina, etc., to 100%. If the crude melted alloy be poured into this oxidizing bath, there would result approximately the following final alloy: Manganese, 74%, iron 25%, and carbon .6%, with balance undetermined, the silicon having been oxidized to silica and, with some iron and manganese oxids, having formed a thin fusible slag. At the same time, some or all of the carbon is oxidized, and the bath is increased by the reduced iron and manganese.

Such an alloy is highly desirable on account of low carbon and high manganese, the latter being materially higher than could be obtained from the ore by known methods of smelting. The low grade of ore makes the process relatively cheap even allowing for the energy required in reducing the silicon in forming the crude alloy.

The oxidizing material can be added wherever the crude alloy is melted, or vice versa, and in practice will depend upon the size of the batch and the conveniences for effecting an intimate mixture of the crude alloy and the oxidizing bath without lowering the temperature necessary for the reaction. From the figures here given, the required proportions for obtaining the results stated can be easily determined.

Having described my invention I claim,

1. A process for producing low carbon ferro-alloys, which comprises reducing the ore of the metal in question by carbon in the presence of iron and of a sufficient proportion of silicon to hold the carbon back from entering the alloy, and then eliminating the silicon.

2. A process for producing low carbon ferro-alloy comprising reducing the ore of the metal in question by carbon in a high temperature furnace in the presence of iron and silica, and reducing enough of the silica to silicon to hold back the carbon from entering the alloy to a detrimental extent, and then oxidizing the silicon.

3. A process for producing low carbon ferro-alloys comprising the reducing the ore of the metal in question by carbon in the presence of a supply of iron and of silica, and reducing sufficient silica to silicon to hold back the carbon from entering in more than a limited amount the triple alloy of iron, silicon and the alloying element, and finally oxidizing the silicon.

4. A process for producing substantially carbon free ferro-alloys from lean ores of the alloying element containing silica, comprising the reducing said ore by carbon in the presence of a source of supply of iron and reducing sufficient of the silica to silicon to hold back the carbon from entering the alloy, and finally oxidizing the surplus silicon and some of the remaining small amount of carbon quantitatively by a molten mixture of iron oxid and lime.

5. A process for producing low carbon ferro alloys consisting in forming a crude alloy by reduction of an ore of the alloying metal in the presence of carbon, iron and silicon, and treating the fused alloy with a bath comprising a fused metal oxid whereby to slag off the silicon and form a final alloy richer in alloying metal and lower in carbon.

In testimony whereof I have signed my name to this specification.

JOSEPH ESREY JOHNSON, JR.